(12) United States Patent
Desaute (10) Patent No.: US 9,535,168 B2
(45) Date of Patent: Jan. 3, 2017

(54) RADIOGRAPHIC IMAGING DEVICE AND DETECTOR FOR A RADIOGRAPHIC IMAGING DEVICE

(75) Inventor: Pascal Desaute, Paris (FR)

(73) Assignee: EOS IMAGING, Paris (FR)

( * ) Notice: Subject to any disclaimer, the term of this patent is extended or adjusted under 35 U.S.C. 154(b) by 507 days.

(21) Appl. No.: 13/696,415

(22) PCT Filed: May 6, 2010

(86) PCT No.: PCT/IB2010/001805
§ 371 (c)(1),
(2), (4) Date: Nov. 6, 2012

(87) PCT Pub. No.: WO2011/138631
PCT Pub. Date: Nov. 10, 2011

(65) Prior Publication Data
US 2013/0058458 A1    Mar. 7, 2013

(51) Int. Cl.
*G01T 1/185* (2006.01)
(52) U.S. Cl.
CPC ..................... *G01T 1/185* (2013.01)
(58) Field of Classification Search
CPC ............. G01T 1/00; G01T 1/02; G01T 1/017; G01T 1/17; G01T 1/16; G01T 1/185; G01T 1/28
(Continued)

(56) References Cited

U.S. PATENT DOCUMENTS

| | | | | |
|---|---|---|---|---|
| 4,652,918 A | * | 3/1987 | Liu | .......................... H04N 5/32 |
| | | | | 348/E5.086 |
| 4,999,501 A | * | 3/1991 | Lacy | ..................... H01J 47/062 |
| | | | | 250/374 |

(Continued)

FOREIGN PATENT DOCUMENTS

EP         0730291 A1      4/1996

OTHER PUBLICATIONS

Menk et al, "Imaging with HIgh Dynamic Using an Ionization Chamber", Medical Imaging 2003, Physics of Medical Imaging, Feb. 16-18, 2003, San Diego CA, USA, vol. 5030, 2003, pp. 810-817, XP002628959.*

(Continued)

*Primary Examiner* — David E Smith
(74) *Attorney, Agent, or Firm* — BCF LLP (57) ABSTRACT

An X-ray detecting apparatus for the detection and localization of ionizing X-ray or gamma radiation in radiography, the apparatus comprising: an X-ray detector including: conversion means for converting incident x-ray photons of an incident x-ray photon beam into detectable electrical charges; and amplification means for amplifying the electrical charges in the detector by an non-linear amplification gain factor the non-linear amplification gain being characterized by a decrease in amplification gain at high fluxes of incident x-ray photons; and amplification gain adjustment means configured to vary the amplification gain of the amplification means according to the emission parameters of an x-ray source providing the incident x-ray photon beam for the radio-graphic examination to be performed and/or the transmitted beam received by the detector from the x-ray source via the subject being imaged. A radiographic imaging device and a method of operating the radiographic imaging device are also presented.

31 Claims, 6 Drawing Sheets

(58) Field of Classification Search
USPC .............. 378/51, 62, 91; 250/336.1, 358.1
See application file for complete search history.

(56) References Cited

U.S. PATENT DOCUMENTS

| | | | | |
|---|---|---|---|---|
| 5,194,726 | A * | 3/1993 | Jonkman | H01J 31/501 250/214 VT |
| 5,604,783 | A * | 2/1997 | Charpak | G01T 1/2935 250/385.1 |
| 6,047,042 | A * | 4/2000 | Khutoryansky | H05G 1/44 378/62 |
| 6,163,029 | A * | 12/2000 | Yamada | G01T 1/247 250/370.01 |
| 7,274,013 | B1 * | 9/2007 | Russ | G01J 3/027 250/252.1 |
| 7,408,166 | B2 * | 8/2008 | Schafer | H04N 5/32 250/370.09 |
| 2007/0007438 | A1 * | 1/2007 | Liu | H04N 5/243 250/214 AG |
| 2007/0158533 | A1 * | 7/2007 | Bamji | H04N 5/335 250/208.1 |
| 2008/0210878 | A1 * | 9/2008 | Friedman | G01T 1/18 250/374 |
| 2011/0187906 | A1 * | 8/2011 | Chaji | H04N 5/35518 348/300 |
| 2013/0068955 | A1 * | 3/2013 | Matsuura | G01T 1/24 250/370.09 |

OTHER PUBLICATIONS

Menk et al, "Imaging with High Dynamic Using an Ionization Chamber", Medical Imaging 2003, Physics of Medical Imaging Feb. 16-18, 2003, San Diego CA, USA, vol. 5030, 2003, pp. 810-817—XP002628959.*

Knoll, "Radiation Detection and Measurement", 1989, John Wiley and Sons, p. 172-173.*

Menk et al, "Imaging With High Dynamic Using an Ionization Chamber", Medical Imaging 2003, Physics of Medical Imaging Feb. 16-18, 2003, San Diego CA, USA, vol. 5030, 2003, pp. 810-817.*

International Search Report of PCT/IB2010/001805; Jun. 7, 2011; Eberle, Katja.

Menk et al. "Imaging with High Dynamic Using an Ionization Chamber", Medical Imaging 2003, Physics of Medical Imaging, Feb. 16-18, 2003, San Diego, CA, USA, vol. 5030, 2003, pp. 810-817, XP002628959.

Knoll "Radiation Detection and Measurement", 1989, John Wiley and Sons, p. 172, line 6-p. 173, line11, XP002628960.

English Abstract of EP0730291 Published Sep. 4, 1996.

Sarvestani et al., Study of the high rate performance of the MicroCAT detector, Nuclear Physics B (Proc. Suppl.) 78(1999)431-437.

* cited by examiner

RADIOGRAPHIC IMAGING DEVICE AND DETECTOR FOR A RADIOGRAPHIC IMAGING DEVICE

FIELD OF THE INVENTION

The present invention relates to an X-ray detector for the detection and localisation of ionising X-ray or gamma radiation in radiographic imaging. The invention further relates to a radiographic imaging device including such an X-ray detector and a method of operating a radiographic imaging device.

BACKGROUND OF THE INVENTION

Traditionally in radiographic imaging a beam of X-rays emitted by a source is directed through a subject to be examined, such as the body of a patient. The X-ray beam transmitted through the subject is detected by an X-ray detector and the resulting data provided by the X-ray detector is used to produce a representation in the form of an image of the internal structure of the subject. The absorption of the X-rays traversing the subject is linked to the density of the body tissues or the density of the material constituting an object under examination.

Figure 1:
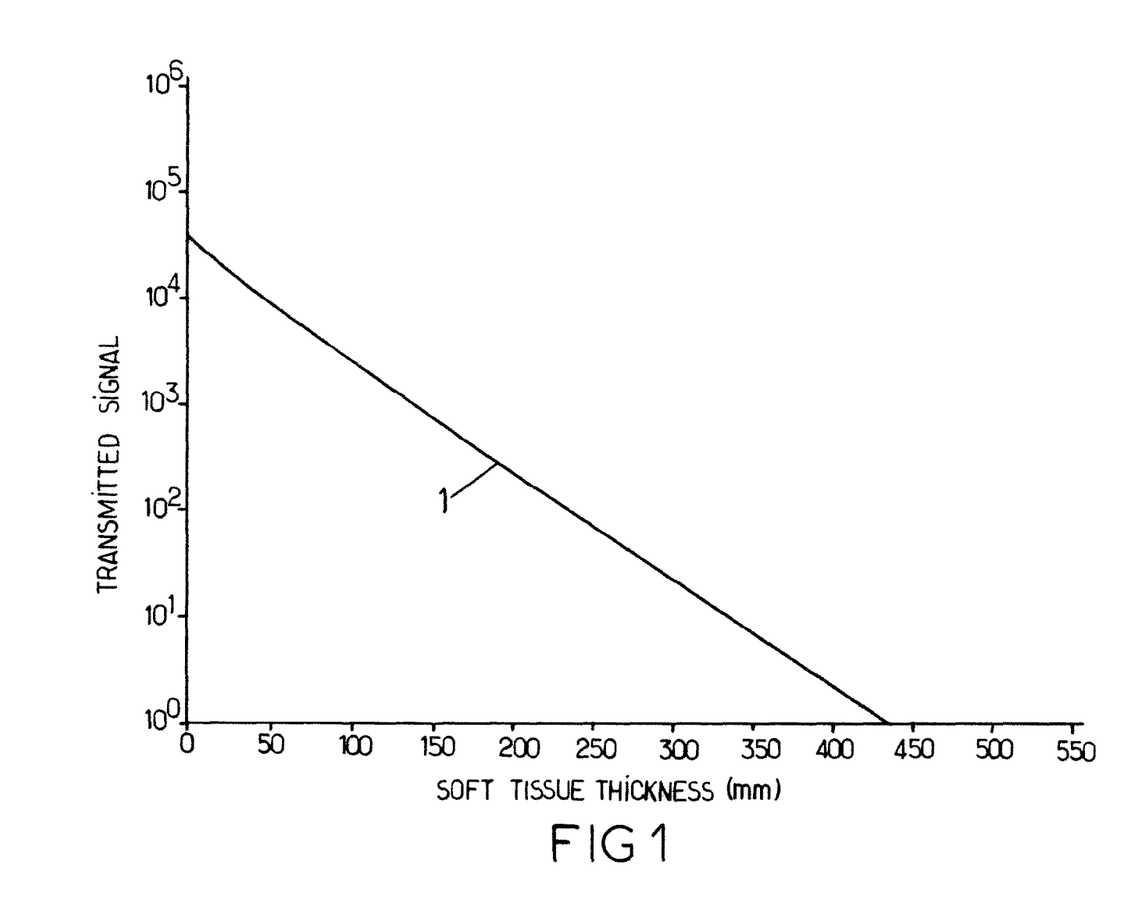
FIG. 1 is a graph illustrating the dynamic range of transmission of a typical beam of X-rays of 100 kV filtered by 2.5 of aluminium through a range of thicknesses of soft tissue.

A difficulty often encountered in radiographic imaging of the human body, however, is the wide dynamic range of absorption of X-rays by the body. Curve 1 in the graph presented in FIG. 1 illustrates an example of the dynamic range of transmission of a typical beam of X-rays of 100 kV filtered by 2.5 of aluminium through a range of thicknesses of soft tissue. The range of tissue thicknesses under consideration may be extremely wide, especially in the case of an obese or overweight person. Typically the thickness of the abdomen is around 46 cm for a person of Body Mass Index (BMI) 46 kgm-2. The dynamic transmission range of the X-ray beam in a body can reach 3 to 5 decades depending on the BMI of the patient.

In digital radiography a radiographic image is constituted of pixels, each pixel corresponding to an element of detection or to a zone of detection. In order to generate an image, each detection pixel is provided with an electronic read-out which enables the electrical signal resulting from X-rays detected during a given integration time to be read. The electronic readout for each detection pixel usually includes a storage capacitor having a predefined charge storage capability. Typically each storage capacitor is dimensioned to be capable of storing the most intense charge signals, in particular those corresponding to a direct part of the X-ray beam (in which photons have been directly transmitted from the X-ray source to the X-ray detector without being absorbed by an object or body) from X-ray sources operating at a high energy (kVp) and high intensity (mAs). Such operating X-ray emission parameters are used, for example, in the radiographic imaging of corpulent bodies in which bone tissues located in deep anatomical zones of the body are being examined. The dynamic range of a quantum limited detector will be therefore defined by the ratio of the output signal corresponding to the direct X-ray beam, to the noise of the electronic readout. When the detector and readout have linear responses, the output signal is a linear function of the detector input signal. This means that anatomical areas of high absorption (for instance equivalent to 1 to 100 photons during the exposure time) having rich anatomical information, such as the bony structures for a musculoskeletal image, will be represented on the output image at the same finesse as areas of very high flux and low anatomical content, such as the skin. This is obviously not optimal for diagnostic needs and can lead to an increase in the dose administered to the patient.

During a radiography examination on a patient with low body corpulence or on an organ of low photon attenuation, the X-ray emission parameters are reduced to provide a less intense beam so that the dose received by the patient is minimised. In certain cases the intensity of the direct X-ray beam can be up to 200 times less than the intensity of the beam for the examination of bone tissues of a highly corpulent person. In these conditions the storage capacitor of the readout electronics only receives around 1/200 of the charge it is capable of accepting and the signal to noise ratio of the electronic read out chain is reduced by the same factor. If the detector or electronic readout is linear, this leads to a significant reduction in the contrast provided in the image and thus reduced image quality. In particular, anatomical areas of high absorption (for instance equivalent to 1 to 100 photons during the exposure time) will have an even lesser (200 times less) grey level range in the output image compared to the previous, high corpulence patient scenario. This is obviously detrimental to the image quality and leads to increasing the dose administered to the patient.

SUMMARY OF THE INVENTION

Accordingly, it would be advantageous to provide a radiographic imaging device providing improved image contrast and quality in anatomical areas of high X-ray absorption, regardless of the patient corpulence.

According to a first aspect of the invention, there is provided an X-ray detecting apparatus for the detection and localisation of ionising X-ray or gamma radiation in radiography, the apparatus comprising: an X-ray detector including conversion means for converting incident x-ray photons of an incident x-ray photon beam into detectable electrical charges; and non linear amplification means for amplifying the charges inside the detector by a non linear amplification gain factor; said non linear amplification factor being characterised by a decrease in the amplification gain in response to an increase in the flux of the incident x-ray photon beam at high incident x-ray flux; and amplification gain adjustment means configured to vary the amplification gain of the amplification means according to the emission parameters of an x-ray source providing the incident x-ray photon beam for the radiographic examination to be performed, and/or the transmitted x-ray photon beam received by the detector via the subject being imaged In this way the amplification gain may be adjusted according to the emission parameters and/or the subject being imaged. Consequently, it is possible to adjust the internal amplification gain of the X-ray detector according to the radiographic study being performed so that, for example, the maximum obtainable signal in the image obtained corresponds to the region of maximum acceptable charge by the read out electronics. Moreover, the internal amplification gain can be adjusted to exploit the non-linear amplification effect so that the low intensity part of the image corresponding to high x-ray attenuation by the subject is highly amplified while the high intensity part of the image corresponding to low x-ray attenuation by the subject is less amplified. Accordingly even for images resulting from weak signals corresponding to high attenuation the contrast in the image is optimised.

A second aspect of the invention provides a radiographic imaging apparatus comprising: an x-ray source for emitting a beam of x-ray photons, a collimator for forming the beam of x-ray photons into a planar beam for transmittal through the object to be imaged; and an x-ray photon detecting apparatus according to any one of the preceding claims for detecting x-ray photons transmitted through the object.

A third aspect of the invention provides a method of operating an X-ray detecting apparatus for the detection and localisation of ionising X-ray or gamma radiation in radiography, the method comprising operating an x-ray source to emit a x-ray beam towards an X-ray detector according to given x-ray emission parameters corresponding to the radiographic examination to be performed; converting incident x-ray photons in the X-ray detector into detectable electrical charges; amplifying the electrical charges in the detector by an amplification gain factor; and adjusting the amplification gain according to the given x-ray emission parameters.

In embodiments of the invention:

the non-linear amplification gain may be characterised by a fall in the rate of increase of the output signal of the detector as the flux of the incident x-ray photon beam increases, the adjustment means being configured to adjust the amplification gain of the non-linear amplification means such that at high incident x-ray flux the output response signal of the x-ray detector tends increasingly slowly towards a saturation level.

the amplification gain adjustment means may be configured to adjust the amplification gain according to the response of the X-ray detector to a direct incident x-ray photon beam.

the amplification gain adjustment means may be configured to adjust the amplification gain so that the amplified electrical charge corresponds substantially to the maximum charge capability of signal processing electronics coupled to the x-ray detector for processing the amplified electrical charge.

the amplification gain adjustment means may be configured to adjust the amplification gain so that the difference between the amplification gain at low x-ray flux and the amplification gain at high x-ray flux is maximised.

the amplification gain adjustment means may be configured to further adjust the amplification gain according to parameters of a preview image obtained of the subject to be imaged the X-ray detector may comprise a gaseous avalanche chamber including:

a gas chamber having an entrance window for the incident x-ray photon beam and containing a gas suitable for converting incident x-ray photons into electron-ion pairs by an ionisation process;

an electrode arrangement located within the gas chamber, and comprising a plurality of electrodes arranged with respect to one another such that when an electric field is applied between the electrodes, a drift zone is formed in which electrons drift towards one of the electrodes and a gaseous avalanche process is activated in the vicinity of the said electrode for amplifying the number of electrons; and wherein the amplification gain adjustment means is configured to adjust the electric field applied between the electrodes in order to vary the amplification gain according to the radiographic exam to be performed.

the electrode arrangement may comprise a first anode electrode comprising a plurality of elongate anode elements disposed between two planar cathode electrodes, the anode electrode and the cathode electrodes being arranged substantially parallel with respect to one another and wherein at least one of the cathode planes comprises a plurality of elongate cathode elements for detecting electrical charge induced by ions, each cathode element being equipped with processing electronics for processing the electrical charge.

the signal processing electronics may include a storage capacitor for storing a quantity of charge collected from the respective cathode element during a given integration time, and wherein the amplification gain adjustment means is configured to adjust the electric field such that the charge collected in response to a direct x-ray beam corresponds to a significant proportion of the maximum storable charge of the storage capacitor.

At least parts of the methods according to the invention may be computer implemented. The methods may be implemented in software on a programmable apparatus. They may also be implemented solely in hardware or in software, or in a combination thereof.

Since parts of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 2:
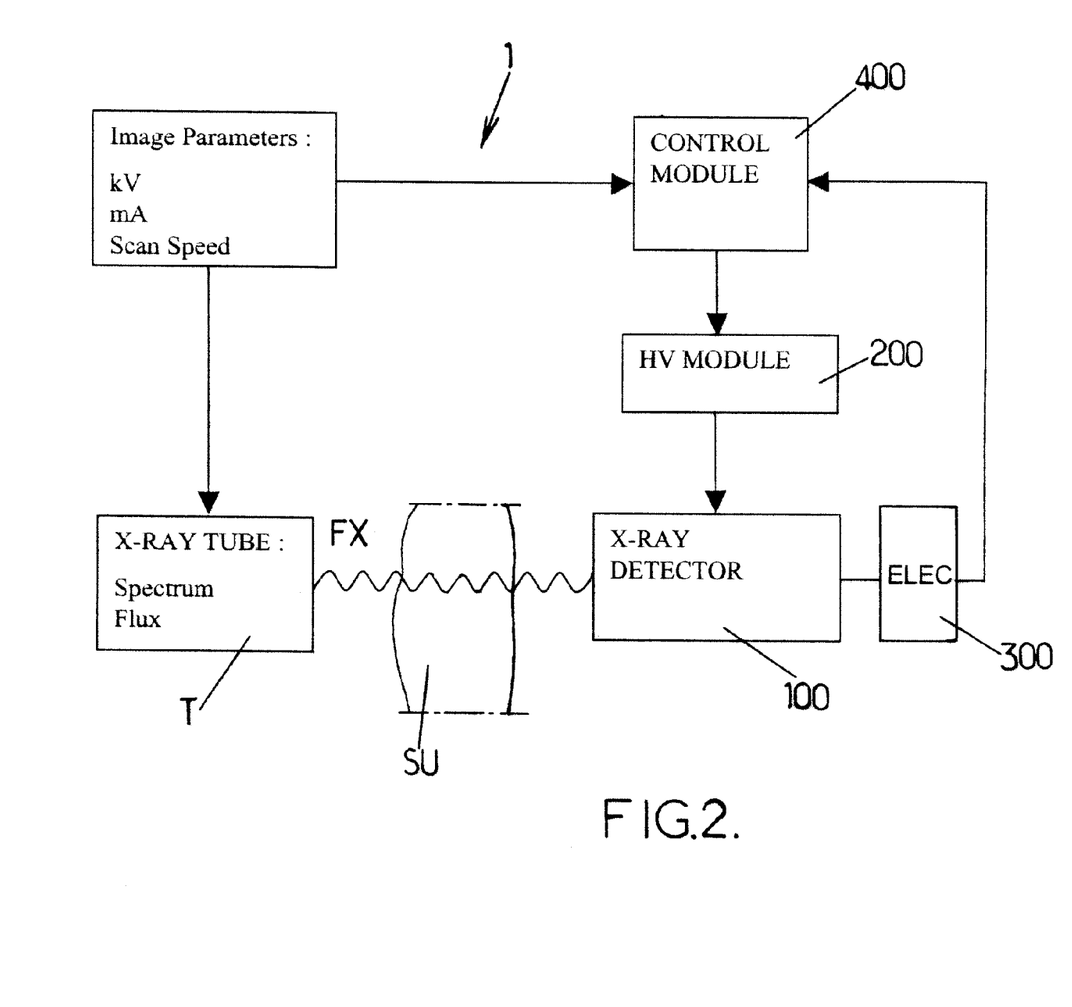
FIG. 2 is a schematic block diagram of a radiography imaging device according to an embodiment of the invention.

A radiographic imaging device according to an embodiment of the invention will be described in detail with reference to FIGS. 2 and 3. FIG. 2 is a schematic representation of a radiographic imaging device 1 according to this embodiment of the invention, comprising an X-ray tube T for delivering a beam FX of X-ray photons to irradiate a subject SU being imaged (for example the body of a patient or part of the body of a patient), a gaseous avalanche detector 100 for detecting the X-rays transmitted through the subject SU which is placed between the x-ray tube T and the detector 100. The X-ray photon flux FX transmitted through the subject SU is detected by detector 100 after selective absorption according to the density of zones of the subject SU through which the X-ray photons pass. The radiographic imaging device 1 further includes a high voltage module 200 for supplying high voltage to electrodes of the detector 100, an electronic read out module 300 for processing the electrical signals output by the detector 100 and a control module 400 for controlling the high voltage module 200. The control module 400 receives electronic signals output by the readout electronic module 300 as well as operating data corresponding to the operating parameters of the X-ray tube T.

Figure 3:
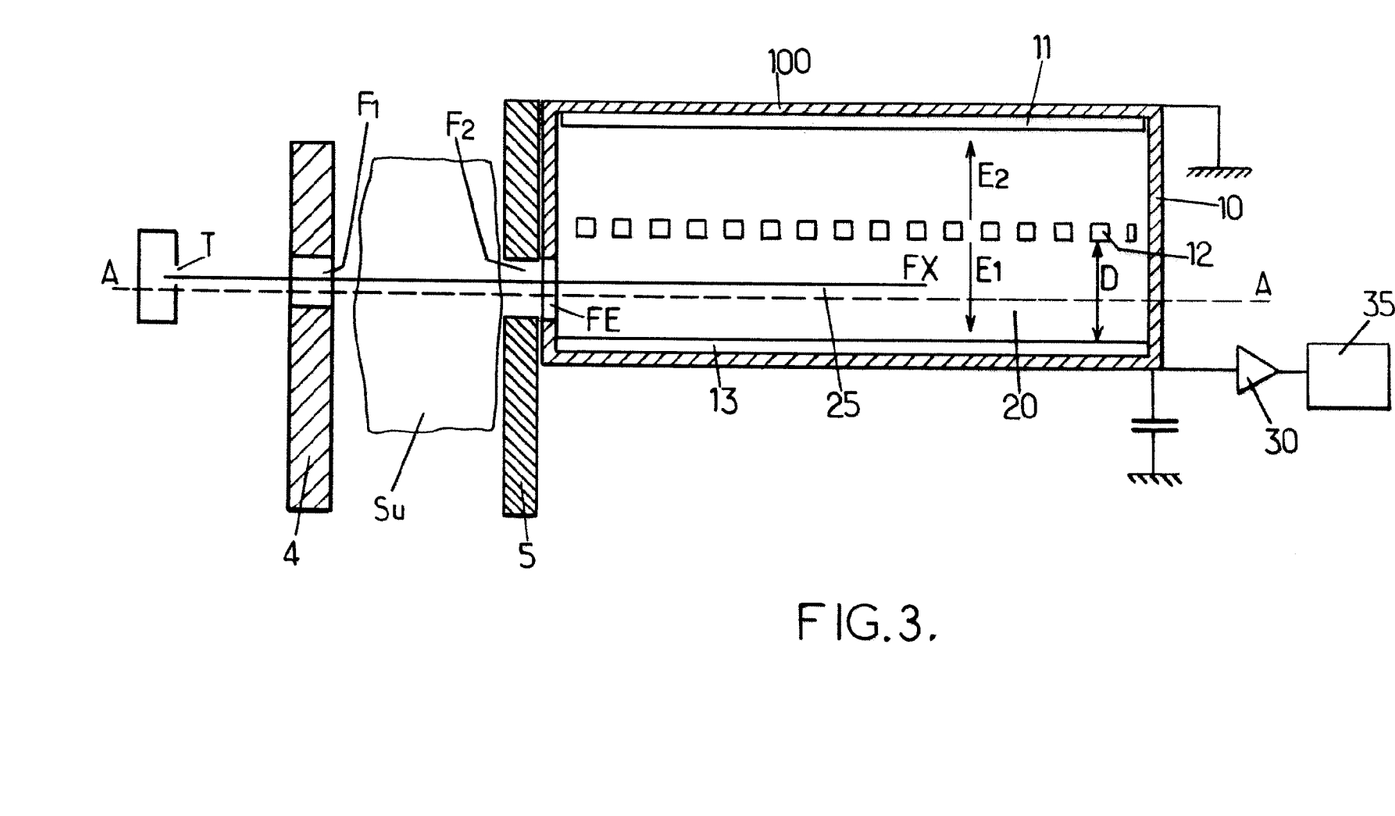
FIG. 3 is a partial sectional view of a radiography imaging device of FIG. 2.

FIG. 3 is a partial sectional view in a plane orthogonal to the plane of the X-ray beam of the radiographic imaging device 1. It will be appreciated that FIG. 3 is not drawn to scale. The radiographic imaging device 1 further includes a source collimator 4, made in lead, for example, defining a longitudinal slot F1 extending in a direction orthogonal to the plane of the paper on which FIG. 3 is presented. The slot F1 forms a diaphragm enabling a planar divergent X-ray beam to be provided for irradiation of the subject SU or part of the subject SU being imaged. It will be appreciated that in alternative embodiments of the invention the collimator 4 may be replaced by other suitable means for forming an essentially planar X-ray beam such as an X-ray diffraction mirror or an X-ray lens etc. An object collimator 5 having a longitudinal slot F2 aligned with the slot F1 of source collimator 4 is optionally placed between the object being imaged SU and the X-ray detector 100 to help to eliminate scattered radiation generated by the object SU.

The gaseous avalanche detector 100 includes a gas chamber 10 provided with an entrance window FE through which the beam of X-rays to be detected enters the detector 100. The entrance window FE is aligned in parallel with collimator slots F1 and F2 and allows the X-ray beam FX to enter the detector 100 with a high level of transmissibility while providing a reliable seal against leaking of the gas from the gas chamber 10 at atmospheric pressure or higher operational pressures.

The gas in the gas chamber 10 is composed of a gas enabling the formation of electron-ion pairs by ionisation interactions of the X-ray photons with the gas, and allowing amplification of the electrons by the Townsend avalanche effect. For this purpose the gas may be made up of a mixture of a rare gas with a high atomic number such as Xenon for example and contained at a high pressure to enable a high proportion of the X-ray photons to be converted by ionisation into charges; and an organic gas such as $C_2H_6$ playing the role as a quencher to stabilise the amplification by the avalanche effect.

The depth of the detector 100 in a direction of the beam FX is of a dimension sufficient to enable the interaction of a major portion of the incident X-ray beam FX with the gas in the gas chamber 10 to provide ionisation electron-ion pairs. The depth may be in a range of 5 to 50 cm for example.

The gas chamber 10 is a conventional type of gas chamber equipped to enable filling and emptying the chamber of gas. The gas in the chamber may be contained in the gas chamber at atmospheric pressure or at a pressure above atmospheric pressure. For example the gas may be contained in the chamber 10 at a pressure of 1 to 20 bar.

An assembly constituted by the X-ray tube T, the slot F1, the slot F2 and the detector module 100 can be formed as a unit by means of a frame. This enables the assembly to be manoeuvred in translation or rotation, in order to ensure an appropriate analysis of the subject SU by scanning procedures. It is not necessary for an understanding of the present invention to describe in detail the mechanical embodiment of such an assembly since the appropriate elements are known to those skilled in the art. In some embodiments, the X-ray tube T and the detector module 100 can be fixed while the subject SU is moved with an appropriate displacement to provide an analysis.

The interior of the detector 100 will be described in more detail with reference to FIGS. 3 to 4. The gas chamber 10 houses a first cathode-electrode 11, an anode-electrode 12 and a second cathode-electrode 13. The three electrodes 11, 12 and 13 are substantially planar and positioned parallel to one another. The anode-electrode 12 is made up of a plane of anode wires 120 and placed between the first cathode-electrode 11 and the second cathode-electrode 13. The electric field in the detector 100 generated by the configuration of high voltages applied to the electrodes, 11, 12 and 13 by the high voltage module 200 provides a drift region for electrical charges created by an ionisation process taking place between incident X-ray photons and gas molecules at a distance from the anode wires as well as an amplification zone in close proximity to the anode wires 120 where the electrical charges are amplified by the gaseous avalanche process. The electric field E1 applied between the cathode-electrode 13 and the anode-electrode 12 influences the amplification gain of the gaseous avalanche process. In general, as the electric field E1 between the cathode-electrode 13 and the anode-electrode 12 increases; the amplification gain of the gaseous avalanche process increases up until a point where the build up of space charges begins to effect the amplification gain as will be described later. Under appropriate configurations of gas constituents, gas pressure and electric field, amplification gains of 10 to $10^4$ can be achieved.

Figure 4:
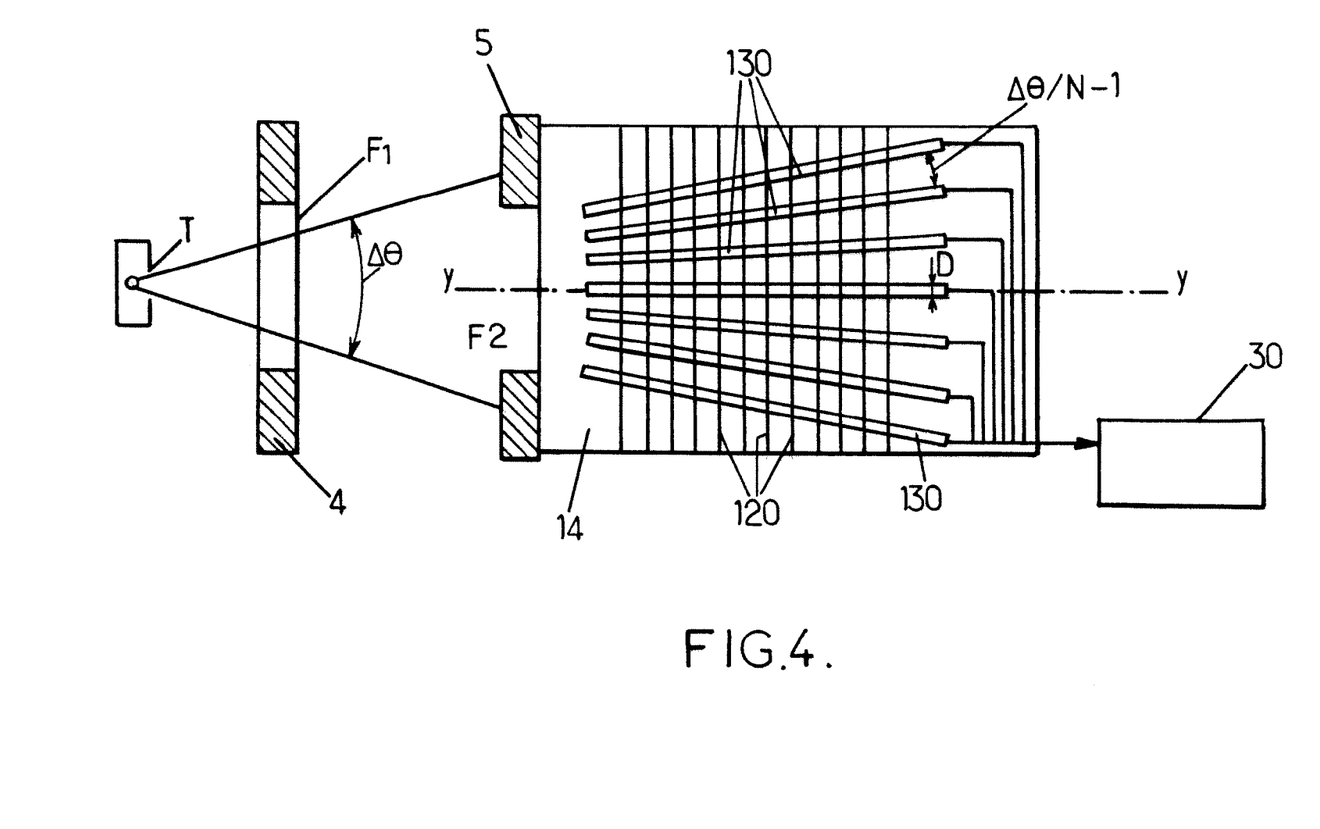
FIG. 4 is a partial sectional view of the device of FIG. 3 taken along a line parallel to the line AA

As illustrated in FIG. 4 the second cathode-electrode 13 is made up of a set of elementary cathode strips 130 spaced apart from one other on an electrical insulating support 14. Each cathode strip 130 is arranged to capture a charge signal induced by the positive ions resulting from the ionisation and avalanche processes. The charge signal enables a value to be attributed to the corresponding pixel of a line of the reconstructed image as a function of the quantity of charge captured in response to the transmitted X-ray beam FX. As illustrated in FIG. 4 the cathode strips 130 can be arranged on the substrate 14 to converge towards the X-ray tube T. This configuration of cathode strips 130 helps to eliminate the parallax error due to the projection of the plane of the x-ray beam on the plane of cathode-electrode 13.

The anode wires 120 are arranged orthogonally to the principal direction of the X-ray beam FX and thus orthogonal to the cathode strips 130 as illustrated in FIG. 4. The anode wires 120 are separated from one another by a distance to the order of a few millimeters. Such an arrangement of anode wires enables a uniform and continuous (non-discrete) amplification operation in a direction perpendicular to the cathode strips 130. This helps to prevent the spatial resolution of the resulting image to be limited by the distance between two anode wires 120.

The high voltage module 200 includes biasing circuitry for applying a first high voltage HV1 to the first cathode electrode 11, a second high voltage HV2, which is positive with respect to HV1, to the anode electrode 12 and a third high voltage HV3, which is negative with respect to HV2, to the second cathode-electrode 13 in order to generate a drift zone in which electrons resulting from ionisation processes in the gas drift towards the anode electrode 12 and an amplification zone in the vicinity of the anode electrode 12 where negative charge is amplified by the avalanche effect. For example if the gas chamber 10 contains a xenon gas mixture at a pressure of around 6 bar the first and second cathode electrodes 11 and 13 may be grounded at 0V and a high voltage HV2 of the order of +2000 to +3000V may be applied to the anode electrode 12. In some embodiments of the invention the high voltage module 200 may be configured to adjust only the high voltage HV2 applied to the anode-electrode 12. In alternative embodiments any combination of the high voltages HV1, HV2 and HV3 applied to the electrodes 11, 12 and 13 may be adjusted, to vary the electric field between the electrodes such that the gain of amplification by the avalanche effect changes.

As will be described later, the high voltages HV1, HV2 and HV3 applied to the electrodes 11, 12 and 13 by means of the high voltage module 200 can be controlled by control module 400 according to the radiographic examination to be carried out and/or according to the corpulence of the subject SU being examined. This may be at least partly achieved by adjusting the high voltages HV1, HV2 and HV3 applied according to the operating emission parameters of the X-ray tube for the specific radiographic examination. Additionally or alternatively the high voltages HV1, HV2 or HV3 may be varied according to data provided by the electronic read-out module 300 in response to irradiation of at least part of the detector 100 by a direct x-ray beam.

During operation of the X-ray detector 100 X-ray photons entering into the gas chamber 10 through the entrance window FE between anode-electrode 12 and cathode-electrode 13 interact with the pressurised xenon gas mixture in the drift zone by an ionisation process to produce primary electrons and corresponding ions. The primary electrons may continue to provide more electron-ion pairs by further ionisation processes along their trajectory through the detector 100. Under the effect of the drift field created between the cathode electrodes 11, 13 and the anode electrode 12, electrons drift towards the plane of anode wires 120 while the positive ions drift towards the cathode strips 130. A proportion of the positive charges may drift towards first cathode electrode 11. In the intense electric field created in the region close to the anode wires 120 the electrons accelerate towards the anode wires 120 and are amplified by means of the avalanche effect creating further electron ion pairs.

The cathode strips 130 capture the positive charge created by the ionisation and avalanche effects inducing corresponding electrical pulses. The processing of the electrical pulses enables the interacting x-ray photons to be localised and, where appropriate, the amount of charge resulting from the x-ray photons to be determined.

The electronic readout module 300 includes a set of charge amplifiers 30, each charge amplifier 30 being coupled to an individual cathode strip 130 and outputting an amplified charge signal corresponding to the charge collected by the respective cathode strip 130. The output of each amplifier 30 can be coupled to an output capacitor or pulse processing electronics. In some embodiments of the invention an analogue to digital circuit can be used to provide a digital signal proportional to the number of ions detected in a given time or a pulse counter for counting the number of charges generated over a given time period can be used. Other suitable signal processing electronics for processing the charge signals may be used.

Each cathode strip 130 is provided with a charge capacitor CI disposed between the cathode strip 130 and ground, at the input to the charge amplifier 30, for storing a quantity of charge collected by the corresponding cathode strip during a given integration time. In embodiments of the invention the integration time of the charge signal stored by the capacitor CI each cathode strip 130 is minimised. This helps to enable acquisition of a non-saturated electronic signal over an extended dynamic range of each pixel of the resulting image while still enabling high gaseous amplification.

Figure 5A:
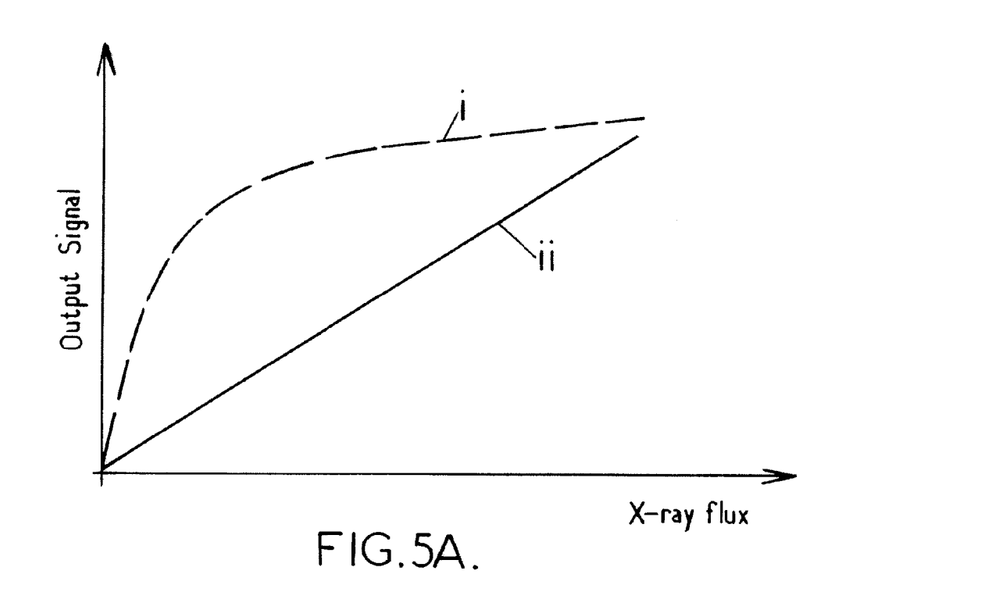
FIGS. 5A and 5B are graphical representations illustrating the non-linear response of a detector to an incident x-ray flux, according to embodiments of the invention
Figure 5B:
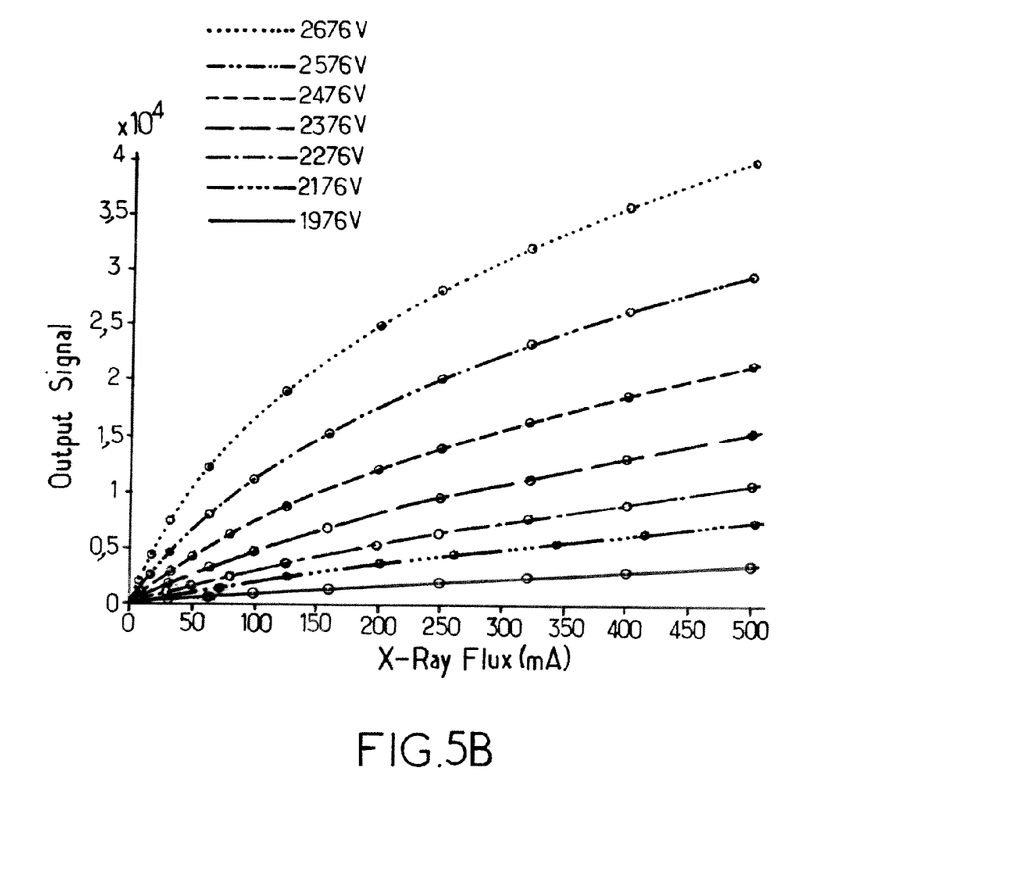

Gaseous avalanche detectors in general demonstrate a reduction in the amplification gain when the space-charge created in the amplification region by the avalanche processes in the vicinity of the anode wires increases beyond a certain point. This results from space-charge effects where the presence of the electrical charges created by the avalanche processes distorts the electrical field close to the anode wires thereby reducing the gas amplification gain from what it would be were the space charges not present. The decrease in the amplification gain from space charge effects is exhibited by a fall in the amplification gain in response to an increase in the incoming x-ray flux. In a detector of the prior art the gain remains constant with increasing x-ray flux. Such a reduction in amplification gain results in a non linear response of the output signal of the detector as a function of the intensity of the X-ray beam as illustrated in FIG. 5A (i). This non-linear curve clearly demonstrates the rate of increase in the amplitude of the output signal in response to changes in the x-ray flux being reduced as the intensity of the x-ray beam increases. At high fluxes the output response tends increasingly slowly towards a saturation level. In contrast a linear response resulting from a fixed amplification gain factor of the prior art is illustrated by curve (ii). FIG. 5B illustrates the relationship between the output signal of the detector in response to an increasing X-ray flux for different internal electrical field strengths of the detector. At each electrical field strength defined by the high voltages applied between the electrodes there is an associated gain regime illustrated by the curve shape. The saturation effect in the output signal becomes more pronounced as the electric field generated between the electrodes is increased as illustrated in 5B. As the high voltage applied between the electrodes generating the amplification effect is increased the difference between the higher amplification gain at low fluxes compared to the lower amplification gain at high fluxes increases.

This saturation effect in the output signal resulting from the change in amplification gain at increased x-ray flux may be exploited in embodiments of the invention in order to extend the dynamic range of X-ray flux that can be processed by the read out electronics 300 of the detector. At appropriate high voltage settings even as the intensity of the X-ray flux increases, the quantity of charge received by each cathode strip 130 will not exceed the maximum charge acceptable by the corresponding storage capacitor CI because of the slowing increase in the amplitude of the output signal resulting from the decrease in amplification gain.

The extended dynamic range of each pixel resulting from the saturation effect can thus enable the dynamic range of an entire human body to be covered while still providing good sensitivity over the entire range of thickness of body tissue imaged. Exploitation of the gain saturation can allow whole body radiographic images of high quality to be obtained.

Moreover at low X-ray flux the slope of the response curve as illustrated in FIG. 5A is steeper and consequently the change in the quantity of charge output in response to a change in X-ray flux is greater at low x-ray flux thereby providing improved contrast in the resulting image at low X-ray flux. With reference to FIG. 5B the higher the high voltage applied the more pronounced the non-linearity, thus the high voltage applied to the electrodes of the detector may be increased to favour a more pronounced non-linearity.

Low corpulent parts of the body transmit a large fraction of the incident X-ray beam FX. As a consequence, by exploiting the fall in amplification gain as hereinbefore described these zones are thus imaged in conditions of high space charge and reduced amplification gain. The reduced amplification gain can help to moderate the large variations of intensity of the X-ray beam encountered when imaging such zones. In contrast in parts of the body with high corpulence, such as the abdomen, the incident beam of x-rays FX is highly attenuated. Thus by exploiting the saturation effect resulting from the non-linear amplification these parts of the body are imaged in conditions of low space charge and high amplification gain. The higher amplification can accentuate the small variations in attenuation encountered by the X-ray beam in these zones leading to improved image quality.

As a consequence, high voltage HV1, HV2 and/or HV3 applied by the high voltage module 200 to at least one of the corresponding electrodes 11, 12 and 13 of the detector 100 can be adjusted to favour operation of the detector in the saturation mode so that radiographic images of improved contrast and image quality may be obtained for areas of high absorption.

The high voltage HV1, HV2 and/or HV3 applied to one or more of the electrodes 11, 12 and 13 by the high voltage module 200 can also be adjusted to vary the amplification gain for the amplification of charges in the detector by the avalanche process such that the charge collected by a cathode strip 130, in response to a direct X-ray beam operating at the set emission X-ray source parameters, corresponds to the region of maximum acceptable charge of the corresponding output capacitor Cl. This allows the full dynamic range of the read out electronics to be exploited regardless of the imaging scenario. As a consequence an increased signal to noise ratio per pixel as well as an improved image contrast can be provided.

Accordingly, the radiographic imaging device according to embodiments of the invention enables the amplification gain of the detector 100 to be adjusted by varying the high voltage applied to at least one of the electrodes 11, 12 and 13 according to the radiographic examination to be performed i.e. to the corpulence of the subject being imaged or the part of the body being imaged.

Figure 6:
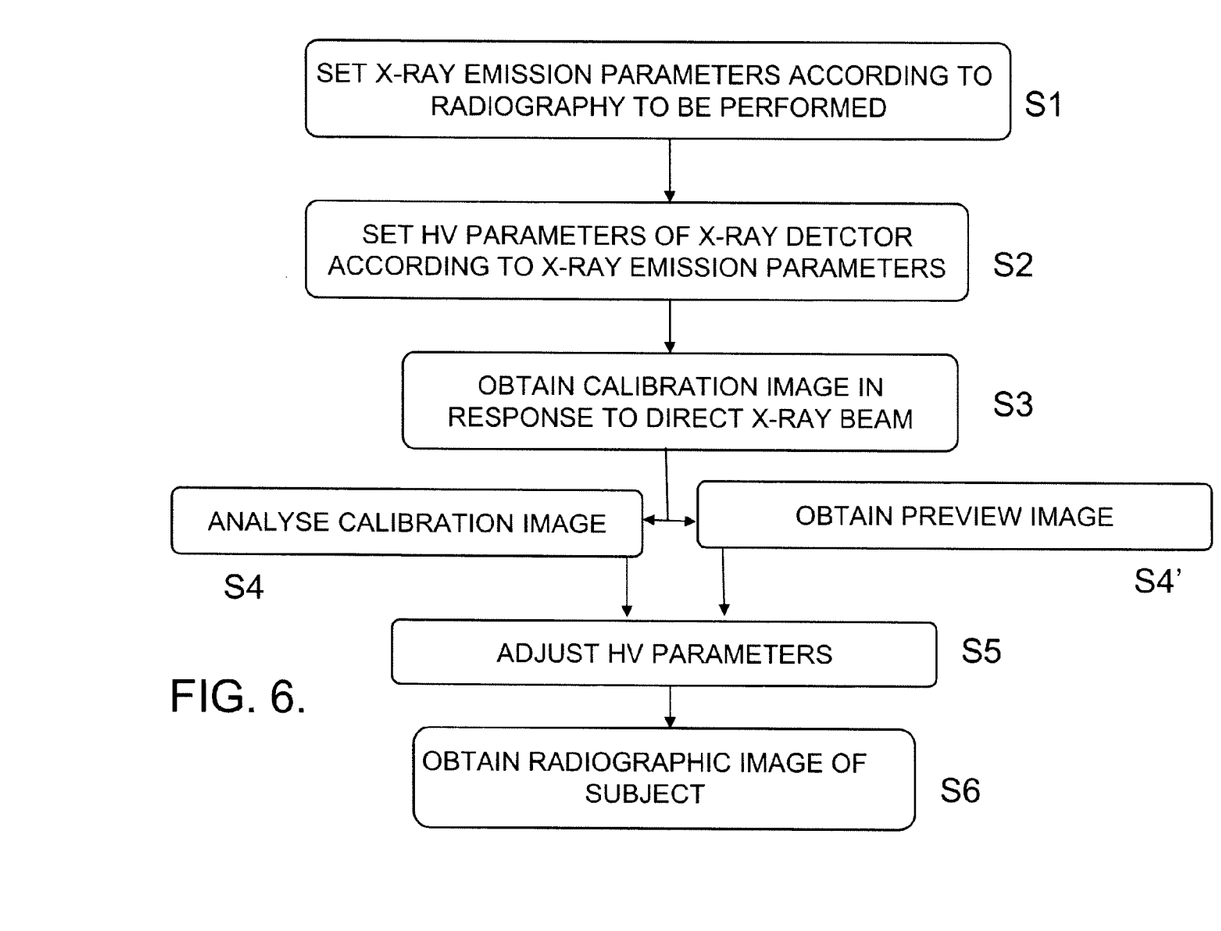
FIG. 6 is a flow chart of steps of a method of operating an x-ray detector for radiographic imaging according to embodiments of the invention

An example of operation of the radiographic imaging device will now be explained with reference to FIG. 6. A first step S1 involves setting the operating emission parameters of the X-ray tube T (kV, mA, scanning speed) according to the corpulence of the patient or the zone of the patient to be imaged. These emission parameters define the spectrum and the flux of the X-rays emitted from the X-ray tube T. For example, for imaging thick tissue in an obese patient, the x-ray emission parameters will be set to provide a more intense X-ray beam than would be set for the imaging of thin tissue of a child.

In step S2 the control module 400 adjusts the high voltage applied to the anode-electrode 12 using an abacus dataset defining the typical electric field for achieving a non linear amplification gain and exploitation of the full dynamic range of the read out electronics according to the set X-ray tube emission parameters. Thus, for example, the high voltage HV2 applied to anode-electrode 12 for a radiographic examination for a child involving a zone of high photon absorption such as the abdomen may be higher than the high voltage HV2 applied to anode-electrode 12 for a radiographic examination of the abdomen of an obese patient. This is so that reduced flux of X-ray photons due to the reduced intensity of the X-ray beam used for imaging a child is compensated for by increased amplification gain enabling the full dynamic of the readout electronic to be exploited. The high voltage is also set to an output response to be obtained in which at high x-ray fluxes for the preset X-ray tube emission parameters the output signal slowly tends towards a saturation level due to a non-linear amplification gain. The saturation level can correspond substantially to the maximum acceptable charge of the readout electronics. The high voltage may also be adjusted at this stage so that the difference between the amplification gain at low x-ray flux and the amplification gain at high x-ray flux is maximised. It will be appreciated that in some embodiments of the invention, steps S1 and S2 may be carried out automatically according to pre-stored calibration data corresponding to a particular radiography exam and obtained from a prior calibration process.

In further embodiments of the invention as an optional step before carrying a radiographic imaging examination of the subject in step S3 a calibration acquisition may be performed by activating the X-ray tube T with the set x-ray emission parameters and obtaining a calibration image from the detector 10 in response to a direct X-ray flux FX. The calibration image obtained in this way can then be analysed in step S4 to determine the resulting pixel counts for each detecting element. Using the calibration image and a previously calculated gain model defining amplification gain as a function of electric field applied, the high voltage HV2 to be applied to anode-electrode 12 for acquisition of a radiographic image of the patient is calculated. The high voltage HV2 is adjusted in step S5 such that the a non-linear amplification gain mode corresponding to the pre-set x-ray parameters is enabled and such that the charge collected by a cathode strip 130 in response to the direct X-ray beam corresponds substantially to the maximum charge capability of each charge capacitor CI of the read out electronics, and that the intensity of the image pixels do not exceed the quantum limit of the electronics. Again it will be appreciated that steps S3 to S5 may be carried out in a calibration phase carried out at an earlier time and the operational parameters stored for subsequent image acquisitions.

In addition to step S4 or alternatively to step S4, in step S4' using the set x-ray emission parameters and the adjusted high voltage parameters a preview radiographic examination may be performed on the subject SU. The high voltage can be further finely adjusted in step S5 according to the detected signal from the transmitted x-ray beam so that the gain parameters are finely optimised according to the preview image obtained. Thus, in step S5 the high voltage parameters may be adjusted according to the calibration image and/or according to the preview image. Subsequent to this step the radiographic examination may be performed on the subject using the adjusted high voltage parameters to obtain a radiographic image of the subject—step S6.

In some embodiments of the invention the imaging process may include a pre-calibration phase in which a number of calibration acquisitions as described above are carried out in accordance with an abacus in order to set the parameters of the gain model. The gain model is then used in subsequent image acquisition phases during a preset validity period of, for example, one or more days to calculate the high voltage required for the particular radiographic exams being performed. This particular embodiment reduces the time between two patient imaging sessions and minimises the intervention required from the operators of the radiographic imaging device. The calculation performed by the gain model enables the high voltage to be selected for utilisation of the detector in a non-linear amplification gain mode and avoids saturations of pixels in the image originating from quantum limits of the electronics.

In embodiments of the invention the adjustment of the amplification gain of the x-ray detector according to the density or the corpulence of the subject being imaged enables the dose of X-rays to be adapted to the subject being imaged and a high level of contrast to be obtained in the resulting radiographic image since the full dynamic range of the electronic read out can be exploited. The exploitation of the non-linearity of the amplification gain allows the contrast in zones of interest corresponding to low x-ray fluxes to be further optimized. Radiographic images of an entire human body from the head to foot may even be obtained by maintaining a dynamic range where both thin and thick parts of the body can be visualised with the same level of finesse.

Although the present invention has been described hereinabove with reference to specific embodiments, the present invention is not limited to the specific embodiments, and modifications will be apparent to a skilled person in the art which lie within the scope of the present invention. For example, while embodiments of the invention have been described with respect to a particular configuration of a gaseous avalanche detector, it will be appreciated that any configuration of x-ray detector may be used in which the amplification gain and thus the amplitude of the output charge signal may be varied by adjusting high voltages applied to the electrodes of the detector, and in which the amplification gain is non-linear resulting in a saturation effect in which the increase in output signal in response to x-ray flux slows down as the x-ray flux increases. Consequently, suitable gas detectors may be used such as for example that described in FR 0957243 or EP 0678 896 which are incorporated herein in their entirety for all purposes by reference thereto.

For example; in the case of the detector described in European patent application EP 0678896 the high voltage applied to the multiplication proportional grid can be adjusted to vary the internal amplification of the detector according to the radiographic examination to be performed. Alternatively the configuration of the detector described in EP 0810631 may be used. In this case the high voltage applied to the anode electrode 14 or the cathode electrode 13 may be varied to change the internal amplification of the detector.

Moreover the invention is not limited to gaseous avalanche detectors. In further embodiments of the invention the gaseous avalanche detector may be replaced by any suitable x-ray detector having a variable amplification gain which decreases at higher input x-ray flux.

While the foregoing embodiments have been described in relation to medical radiography it will be appreciated that methods according to embodiments of the invention can find applications in both medical and industrial radiographic imaging as well as in security scanning applications.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An x-ray detecting apparatus for the detection and localisation of ionising x-ray or gamma radiation in radiography, the apparatus comprising:
    an x-ray detector including:
        conversion means for converting x-ray photons of an incident x-ray photon beam into electrical charges; and
        non-linear amplification means for amplifying, within the detector, the electrical charges by a non-linear amplification gain factor, said non-linear amplification factor being characterised by a decrease in amplification gain in response to an increase in the flux of the incident x-ray photon beam at high incident x-ray fluxes; and
    amplification gain adjustment means configured to vary the non-linear amplification gain of the non-linear amplification means according to the emission parameters of an x-ray source providing the incident x-ray photon beam for the radiographic examination to be performed and/or according to the transmitted beam received by the detector from the x-ray source via a subject being imaged,
    wherein the adjustment means is configured to optimize the non-linearity of the amplification gain of the non-linear amplification means such that the difference between the amplification gain at low x-ray flux and the amplification gain at high x-ray flux is optimized by exploiting a saturation effect.

2. An apparatus according to claim 1 wherein the non-linear amplification gain leads to a fall in the rate of increase of the output signal of the detector as the flux of the incident x-ray photon beam increases, the adjustment means being configured to adjust the amplification gain of the non-linear amplification means such that at high incident x-ray flux the output response signal of the x-ray detector tends increasingly slowly towards a saturation level.

3. An apparatus according to claim 1 wherein the adjustment means is configured to adjust the amplification gain of the non-linear amplification means such that the difference between the amplification gain at low x-ray flux and the amplification gain high x-ray flux is maximised.

4. An apparatus according to claim 1 wherein the amplification gain adjustment means is configured to adjust the amplification gain according to the response of the x-ray detector to a direct incident x-ray photon beam.

5. An apparatus according to claim 1 wherein the amplification gain adjustment means is configured to adjust the amplification gain so that the amplified electrical charge corresponds substantially to the maximum charge capability of signal processing electronics coupled to the x-ray detector for processing the amplified electrical charge.

6. An apparatus according to claim 1 wherein the amplification gain adjustment means is configured to further adjust the amplification gain according to parameters of a preview image obtained of the subject to be imaged.

7. An apparatus according to claim 1 wherein:
    the x-ray detector comprises a gaseous avalanche chamber including:
        a gas chamber having an entrance window for the incident x-ray photon beam and containing a gas suitable for converting incident x-ray photons into electron-ion pairs by an ionisation process;

an electrode arrangement located within the gas chamber, and comprising a plurality of electrodes arranged with respect to one another such that when an electric field is applied between the electrodes, a drift zone is formed in which electrons drift towards one of the electrodes and a gaseous avalanche process is activated in the vicinity of the said electrode for amplifying the number of electrons; and wherein
the amplification gain adjustment means is configured to adjust the electric field applied between the electrodes in order to vary the amplification gain.

8. An apparatus according to claim 7 wherein the electrode arrangement comprises a first anode electrode comprising a plurality of elongate anode elements disposed between two planar cathode electrodes, the anode electrode and the cathode electrodes being arranged substantially parallel with respect to one another and wherein at least one of the cathode planes comprises a plurality of elongate cathode elements for detecting charge signals induced by ions, each cathode element being equipped with signal processing electronics for processing the charge signals.

9. An apparatus according to claim 8 wherein the signal processing electronics includes a storage capacitor for storing a quantity of charge collected from the respective cathode element during a given integration time, and wherein the amplification gain adjustment means is configured to adjust the electric field such that the charge collected in response to a direct x-ray beam corresponds to a significant proportion of the maximum storable charge of the storage capacitor.

10. A radiographic imaging apparatus comprising:
an x-ray source for emitting a beam of x-ray photons;
a collimator for forming the beam of x-ray photons into a planar beam for transmittal through the object to be imaged; and
an x-ray photon detecting apparatus according to claim 1 for detecting x-ray photons transmitted through the object.

11. An x-ray detecting apparatus according to claim 1, wherein:
said amplification gain adjustment means are configured to vary the non-linear amplification gain of the non-linear amplification means according to the emission parameters of the x-ray source providing the incident x-ray photon beam for the radiographic examination to be performed and according to the transmitted beam received by the detector from the x-ray source via the subject being imaged.

12. An x-ray detecting apparatus according to claim 1, wherein:
said amplification gain adjustment means are configured to vary the non-linear amplification gain of the non-linear amplification means according to the emission parameters of an x-ray source providing the incident x-ray photon beam for the radiographic examination to be performed such that the non-linear amplification gain can be optimized with respect to patient corpulence and according to the transmitted beam received by the detector from the x-ray source via the subject being imaged such that the non-linear amplification gain can be optimized with respect to patient organ.

13. An x-ray detecting apparatus according to claim 1, wherein:
said adjustment means is configured to optimize the non-linearity of the amplification gain of the non-linear amplification means such that a low intensity part of an image corresponding to high x-ray attenuation by the subject is highly amplified while a high intensity part of the image corresponding to low x-ray attenuation by the subject is less amplified.

14. An x-ray detecting apparatus according to claim 1, wherein said adjustment means is configured to optimize the non-linearity of the amplification gain of the non-linear amplification means such that:
a maximum obtainable signal in an image obtained corresponds to a region of maximum acceptable charge by read out electronics; and
a low intensity part of the image corresponding to high x-ray attenuation by the subject is highly amplified while a high intensity part of the image corresponding to low x-ray attenuation by the subject is less amplified.

15. An x-ray detecting apparatus according to claim 1, wherein:
said amplification gain adjustment means is configured to vary the non-linear amplification gain of the non-linear amplification means according to the emission parameters of an x-ray source providing the incident x-ray photon beam for the radiographic examination to be performed such that the non-linear amplification gain can be optimized with respect to patient corpulence and according to the transmitted beam received by the detector from the x-ray source via the subject being imaged such that the non-linear amplification gain can be optimized with respect to patient organ; and
wherein said adjustment means is configured to optimize the non-linearity of the amplification gain of the non-linear amplification means such that:
the maximum obtainable signal in an image obtained corresponds to a region of maximum acceptable charge by read out electronics, and
a low intensity part of the image corresponding to high x-ray attenuation by the subject is highly amplified while a high intensity part of the image corresponding to low x-ray attenuation by the subject is less amplified.

16. A method of operating an x-ray detecting apparatus for the detection and localisation of ionising x-ray or gamma radiation in radiography, the method comprising:
operating an x-ray source to emit a x-ray beam towards an x-ray detector according to x-ray emission parameters corresponding to the radiographic examination to be performed;
converting incident x-ray photons in the x-ray detector into electrical charges;
amplifying the electrical charges, within the x-ray detector, by a non-linear amplification gain factor, said non-linear amplification factor being characterised by a decrease in amplification gain in response to an increase in the flux of the incident x-ray photon beam at high incident x-ray fluxes; and
adjusting the amplification gain according to the given x-ray emission parameters and/or the transmitted beam received by the detector from the x-ray source via the subject being imaged,
wherein the non-linearity of the amplification gain of the non-linear amplification means is optimized such that the difference between the amplification gain at low x-ray flux and the amplification gain at high x-ray flux is optimized by exploiting a saturation effect.

17. A method according to claim 16, wherein the non-linear amplification gain is characterised by a fall in the rate of increase of the output signal as the flux of the incident x-ray photon beam increases, the method further comprising adjusting the amplification gain of the non-linear amplification means such that output response signal of the x-ray detector tends increasingly slowly towards a saturation level in the region of maximum incident x-ray flux.

18. A method according to claim 16 wherein the amplification gain of the non-linear amplification means is adjusted such that the difference between the amplification gain at low x-ray flux and the amplification gain high x-ray flux is maximised.

19. A method according to claim 16, wherein the x-ray source is operated to emit x-ray photons directly to the x-ray detector, the method further comprising obtaining response data from the x-ray detector in response to the direct x-ray photons; and
   adjusting the amplification gain of the amplification means according to the response data.

20. A method according to claim 19 wherein the response data comprises an image, the method further comprising analysing the pixel count of the image for the step of adjusting the amplification gain.

21. A method according to claim 16 wherein the amplification gain is adjusted so that the amplified electrical charge corresponds substantially to the maximum charge capability of signal processing electronics processing the amplified electrical charge.

22. A method according to claim 16, wherein the x-ray detector comprises a gaseous avalanche chamber including:
   a gas chamber having an entrance window for an incident beam of x-ray photons and containing a gas suitable for converting incident x-ray photons into electron-ion pairs by an ionisation process and an electrode arrangement located within the gas chamber comprising a plurality of electrodes; the method comprising
   applying an electric field between the electrodes to form a drift zone which electrons drift towards one of the electrodes and to activate a gaseous avalanche process in the vicinity of the said electrode for amplifying the number of electrons; and
   adjusting the electric field applied between the electrodes in order to vary the amplification gain according to the radiographic exam to be performed.

23. A method according to claim 22 further comprising generating a data set of x-ray source emission parameters and corresponding operational high voltage parameters for configuring the electric field so that the high voltage applied to the electrodes can be to be automatically adjusted according to the x-ray source emission parameters for one or more subsequent radiographic imaging examinations.

24. A method according to claim 23 wherein the electrode arrangement comprises a first anode electrode comprising a plurality of elongate anode elements disposed between two planar cathode electrodes, the anode electrode and the cathode electrodes being arranged substantially parallel with respect to one another and wherein at least one of the cathode planes comprises a plurality of elongate cathode elements for detecting charge signals induced by ions, each cathode element being equipped with signal processing electronics for processing the charge signals, the signal processing electronics including a storage capacitor for storing a quantity of charge collected from the respective cathode element during a given integration duration of time, the method including
   adjusting the electric field between the electrodes such that the charge collected in response to a direct x-ray beam corresponds to a significant proportion of the maximum storable charge of the storage capacitor.

25. A method according to claim 22 wherein the amplification gain is adjusted such that the x-ray detector provides a non-linear response to the intensity of the incident x-ray photons, the non-linear response being characterised by a saturation of the amplification gain at increased intensity of incident x-ray photons.

26. An x-ray detecting apparatus for the detection and localization of ionizing x-ray or gamma radiation in radiography, the apparatus comprising:
   an x-ray detector including:
      conversion means for converting x-ray photons of an incident x-ray photon beam into electrical charges, and
      non-linear amplification means for amplifying, within the detector, the electrical charges by a non-linear amplification gain factor, said non-linear amplification factor being characterized by a decrease in amplification gain in response to an increase in the flux of the incident x-ray photon beam at high incident x-ray fluxes; and
   amplification gain adjustment means configured to vary the non-linear amplification gain of the non-linear amplification means according to emission parameters of an x-ray source providing the incident x-ray photon beam for the radiographic examination to be performed and/or according to the transmitted beam received by the detector from the x-ray source via the subject being imaged so that the non-linear amplification gain can be optimized both with respect to patient corpulence and with respect to patient organ,
   the adjustment means being configured to optimize the non-linearity of the amplification gain of the non-linear amplification means by exploiting a saturation effect simultaneously so that:
      a maximum obtainable signal in an image obtained corresponds to a region of maximum acceptable charge by read out electronics, and
      a low intensity part of the image corresponding to high x-ray attenuation by the subject is highly amplified while a high intensity part of the image corresponding to low x-ray attenuation by the subject is less amplified.

27. The x-ray detecting apparatus of claim 26, wherein a total variation of attenuation level of the incident x-ray photon beam, associated with both a patient corpulence category and a patient organ type, is distributed between variation of said emission parameters of the x-ray source and variation of said non-linear amplification gain.

28. The x-ray detecting apparatus of claim 27, wherein during first detector parameters setting, corresponding to a specific patient corpulence category and to a specific patient organ type, there is variation of both said emission parameters of the x-ray source and said non-linear amplification gain, whereas during subsequent detector parameters adjustment, after some patient organ image analysis, there is only variation of said non-linear amplification gain but no more variation of said emission parameters of an x-ray source.

29. An x-ray detecting apparatus for the detection and localization of ionizing x-ray or gamma radiation in radiography, the apparatus comprising:
   an x-ray detector including:
      conversion means for converting x-ray photons of an incident x-ray photon beam into electrical charges; and
      non-linear amplification means for amplifying, within the detector, the electrical charges by a non-linear amplification gain factor, said non-linear amplification gain factor being characterized by a decrease in amplification gain in response to an increase in a flux of the incident x-ray photon beam at high incident x-ray fluxes; and amplification gain adjustment means configured to vary the non-linear amplification gain factor of the non-linear amplification means according to emission parameters of an x-ray source providing the incident x-ray photon beam for a radiographic examination to be performed so that the non-linear amplification gain factor can be optimized with respect to subject corpulence and/or according to a transmitted beam received by the detector from the x-ray source via a subject being imaged so that the non-linear amplification gain factor can be optimized with respect to a subject organ, said amplification gain adjustment means being configured to vary the non-linear amplification gain factor of the non-linear amplification means so as to favor operation of the detector in a saturation mode so that radiographic images of improved contrast and image quality are obtained for areas of high absorption.

30. An x-ray detecting apparatus for the detection and localization of ionizing x-ray or gamma radiation in radiography, the apparatus comprising:

an x-ray detector including:

conversion means for converting x-ray photons of an incident x-ray photon beam into electrical charges; and non-linear amplification means for amplifying, within the detector, the electrical charges by a non-linear amplification gain factor, said non-linear amplification gain factor being characterized by a decrease in amplification gain in response to an increase in a flux of the incident x-ray photon beam at high incident x-ray fluxes; and amplification gain adjustment means configured to vary the non-linear amplification gain factor of the non-linear amplification means according to emission parameters of an x-ray source providing the incident x-ray photon beam for a radiographic examination to be performed so that the non-linear amplification gain factor can be optimized with respect to subject corpulence and/or according to a transmitted beam received by the detector from the x-ray source via a subject being imaged so that the non-linear amplification gain factor can be optimized with respect to a subject organ, said amplification gain adjustment means being configured to vary the non-linear amplification gain factor of the non-linear amplification means so as to exploit a fall in amplification gain so that low corpulent parts of the subject are imaged in conditions of high space charge and reduced amplification gain, said amplification gain adjustment means being configured to vary the non-linear amplification gain factor of the non-linear amplification means so as to exploit a saturation effect resulting from the non-linear amplification so that high corpulence parts of the subject with high corpulence are imaged in conditions of low space charge and high amplification gain.

31. A radiographic imaging apparatus comprising:

an x-ray source for emitting a beam of x-ray photons;

a source collimator for forming the beam of x-ray photons into a planar beam for transmittal through a subject to be imaged;

an x-ray photon detecting apparatus for detecting x-ray photons transmitted through the subject, the x-ray photon detecting apparatus comprising:

a gaseous avalanche chamber including a gas chamber operated at a high enough voltage to produce a saturation effect at high amplification gain having an entrance window, the gas chamber containing a gas suitable for converting incident x-ray photons into electron-ion pairs by an ionisation process;

an electrode arrangement located within the gas chamber including:

two cathode electrodes, at least one of the two cathode electrodes including a plurality of cathode strips disposed on an electrical insulating support, each cathode strip of the plurality of cathode strips being provided with a charge capacitor; and one anode electrode, the anode electrode being disposed between the cathode electrodes, the anode electrode including a plurality of anode wires, the plurality of anode wires being generally disposed in a plane, the anode and cathode electrodes being substantially planar and disposed parallel to one another;

a high voltage module including biasing circuitry for applying voltages to the anode and cathode electrodes;

a subject collimator for reducing scattered radiation entry into the x-ray photon detecting apparatus, the subject collimator being disposed between the source collimator and the x-ray photon detecting apparatus; and an electronic readout module including a plurality of charge amplifiers, each charge amplifier of the plurality of charge amplifiers being operatively coupled to a corresponding cathode strip of the plurality of cathode strips.

* * * * *